US008962702B2

(12) United States Patent
Mamedov et al.

(10) Patent No.: US 8,962,702 B2
(45) Date of Patent: Feb. 24, 2015

(54) MIXED OXIDE BASED CATALYST FOR THE CONVERSION OF CARBON DIOXIDE TO SYNGAS AND METHOD OF PREPARATION AND USE

(75) Inventors: Aghaddin Mamedov, Sugar Land, TX (US); Shahid N. Shaikh, Houston, TX (US); Clark Rea, Houston, TX (US); Xiankuan Zhang, Houston, TX (US)

(73) Assignee: Saudi Basic Industries Corporation, Riyadh (SA)

( * ) Notice: Subject to any disclaimer, the term of this patent is extended or adjusted under 35 U.S.C. 154(b) by 559 days.

(21) Appl. No.: 13/315,083

(22) Filed: Dec. 8, 2011

(65) Prior Publication Data

US 2013/0150466 A1 Jun. 13, 2013

(51) Int. Cl.
*C07C 27/00* (2006.01)

(52) U.S. Cl.
USPC .......................................... 518/702; 518/700

(58) Field of Classification Search
CPC ............. C01B 3/40; C01B 2203/0238; C01B 2203/1041; C10K 3/026; C10G 2/32; B01J 23/8892
USPC ................................................ 518/700, 702
See application file for complete search history.

(56) References Cited

U.S. PATENT DOCUMENTS

| 1,913,364 A | 6/1933 | Walter et al. |
| 3,479,149 A | 11/1969 | Frilette |
| 4,045,538 A | 8/1977 | Sare et al. |
| 5,346,679 A | 9/1994 | Osaki et al. |
| 5,496,530 A | 3/1996 | Vannby et al. |
| 6,328,945 B1 | 12/2001 | Hufton et al. |
| 7,329,627 B2 | 2/2008 | Wanninger et al. |
| 7,435,759 B2 | 10/2008 | Jung et al. |
| 2003/0113244 A1 | 6/2003 | DuPont et al. |
| 2003/0172590 A1* | 9/2003 | Bhattacharyya et al. .... 48/198.7 |
| 2007/0244208 A1 | 10/2007 | Shulenberger et al. |
| 2010/0105962 A1 | 4/2010 | Mamedov et al. |
| 2010/0111795 A1 | 5/2010 | Cremona et al. |
| 2010/0190874 A1 | 7/2010 | Mamdeov et al. |
| 2011/0301386 A1 | 12/2011 | Mamedov et al. |
| 2013/0150466 A1 | 6/2013 | Mamedov et al. |

FOREIGN PATENT DOCUMENTS

| EP | 1445235 A2 | 12/2004 |
| GB | 2168718 A | 6/1986 |
| GB | 2279583 A | 1/1995 |
| JP | 2006-298782 A | 11/2006 |
| WO | 96/06064 A1 | 2/1996 |
| WO | 2005/026093 A1 | 3/2005 |
| WO | 2008126844 A1 | 10/2008 |
| WO | WO 2008/131898 A1 | 11/2008 |
| WO | 2010069549 A1 | 6/2010 |

OTHER PUBLICATIONS

Qi G X et al. "A Novel catalyst for DME synthesis for CO hydrogenation", J. Mol. Cat. A, Chemical, Elsevier, Amsterdam, NL, Vo. 176, No. 1-2, Nov. 20, 2001, pp. 195-203, XP027396214.
Suzuki et al.; "Selective Hydrogenation of CO2 to CO in the Presence of Excess CO on a MoO3/ZnO Catalyst—A Preliminary Attempt to Yield an Equimolecular Mixture of H2 and CO"; Int. J. Hydrogen Energy; vol. 20; No. 10; pp. 823-830; 1995.
Wang et al.; "Chem. Soc. Rev."; vol. 40; No. 7; pp. 3369-4260; Jul. 2011.
International Search Report for International Application No. PCT/US2012/067669; International Filing Date: Dec. 4, 2012; Date of Mailing: Jul. 3, 2013; 5 pages.
Written Opinion of the International Search Report for International Application No. PCT/US2012/067669; International Filing Date: Dec. 4, 2012; Date of Mailing: Jul. 3, 2013; 8 pages.

* cited by examiner

*Primary Examiner* — Jafar Parsa
(74) *Attorney, Agent, or Firm* — Cantor Colburn LLP

(57) ABSTRACT

The invention relates to a catalyst and process for making syngas mixtures including hydrogen, carbon monoxide and carbon dioxide. The process comprises contacting a gaseous feed mixture containing carbon dioxide and hydrogen with the catalyst, where the catalyst comprises Mn oxide and an auxiliary metal oxide selected from the group consisting of La, Ca, K, W, Cu, Al and mixtures or combinations thereof. The process enables hydrogenation of carbon dioxide into carbon monoxide with high selectivity, and good catalyst stability over time and under variations in processing conditions. The process can be applied separately, but can also be integrated with other processes, both up-stream and/or down-stream including methane reforming or other synthesis processes for making products like alkanes, aldehydes, or alcohols.

23 Claims, No Drawings

MIXED OXIDE BASED CATALYST FOR THE CONVERSION OF CARBON DIOXIDE TO SYNGAS AND METHOD OF PREPARATION AND USE

BACKGROUND OF THE INVENTION

1. Field of the Invention

Embodiments of the present invention relate to catalyst compositions, to processes for making the catalyst compositions of this invention, to catalytic processes for producing a synthesis gas (syngas) mixture under isothermal conditions from carbon dioxide and hydrogen using a catalyst of this invention and to processes for using the syngas mixtures to produce various chemical products.

More specifically, embodiments of the present invention relate to catalyst compositions, to processes for making the catalyst compositions of this invention, to catalytic processes for producing a syngas mixture under isotherm'al conditions from carbon dioxide and hydrogen, where the syngas mixture includes hydrogen, carbon monoxide and carbon dioxide and the processes include contacting a gaseous feed mixture including carbon dioxide and hydrogen with a metal oxide catalyst to produce the syngas mixture. Embodiments of the invention also relate to processes for making the catalyst compositions and processes for utilizing a syngas mixture in the production of various chemical products.

2. Description of the Related Art

United States Pub. No. 20030113244 A1 disclosed a process for the production of a synthesis gas (syngas) mixture that is rich in carbon monoxide, by converting a gas phase mixture of $CO_2$ and $H_2$ in the presence of a catalyst based on zinc oxide and chromium oxide, but not including iron. The presence of both Zn and Cr was indicated to be essential for formation of carbon monoxide and hydrogen mixture at a good reaction rate, whereas the presence of Fe and/or Ni was to be avoided to suppress formation of methane via so-called methanation side-reactions. Formation of methane as a by-product is generally not desired, because its production reduces CO production. The co-production of methane may also reduce catalyst life-time by coke formation and deposition thereof.

In the past decades, numerous processes have been developed to produce syngas, which is one of the most important feedstocks in the chemical industry. Syngas is a gaseous mixture containing hydrogen ($H_2$) and carbon monoxide (CO), which may further contain other gas components like carbon dioxide ($CO_2$), water ($H_2O$), methane ($CH_4$), and/or nitrogen ($N_2$). Natural gas and (light) hydrocarbons are the predominant starting material for making syngas. Syngas is successfully used as synthetic fuel and also in a number of chemical processes, such as synthesis of methanol, ammonia, Fischer-Tropsch type synthesis and other olefin syntheses, hydroformylation or carbonylation reactions, reduction of iron oxides in steel production, etc.

Such syngas processes frequently use methane as the dominate feedstock, which may be converted to syngas by steam reforming, partial oxidation, $CO_2$ reforming, or by a so-called auto-thermal reforming reaction. One of the disadvantages associated with syngas production by steam reforming of methane, which is the most widely applied process to produce syngas, is that the composition of the produced gas mixture is limited by the reaction stoichiometry to $H_2$/CO ratios of 3 or higher.

In order to avoid such drawbacks and to help counteract increasing carbon dioxide ($CO_2$) concentrations in the atmosphere, research has been conducted to manufacture syngas from $CO_2$ as a raw material. The conversion is based on an equilibrium reaction shown here:

$$CO + H_2O \leftrightarrows CO_2 + H_2$$

The forward reaction is known as the water gas shift (WGS) reaction, while the reverse reaction is known as the reverse water gas shift (RWGS) reaction Conversion of $CO_2$ to CO by a catalytic RWGS reaction has been recognized as a promising process for $CO_2$ utilization, and has been the subject of various studies in the past decades. Early work proposed iron oxide/chromium oxide (chromite) catalysts for this endothermic reaction; see, e.g., U.S. Pat. No. 1,913,364. Disadvantages of these catalysts included methane formation and the accompanying catalyst coking problem.

GB 2168718A disclosed combining the RWGS reaction with steam reforming of methane. The combination of the two reactions allowed the molar ratio of hydrogen to carbon monoxide ($H_2$/CO) to be adjusted and to better control the stoichiometric number (SN) given by ($[H_2]-[CO_2])/([CO]+[CO_2])$ in the final syngas mixture to values other than about 3 or higher, depending on the intended subsequent use of the syngas mixture.

GB 2279583A disclosed a catalyst for the reduction of carbon dioxide, which comprised at least one transition metal selected from Group VIII metals and Group VIa metals supported on ZnO alone, or on a composite support material containing ZnO. In order to suppress methane formation and catalyst deactivation, stoichiometric hydrogen/carbon dioxide mixtures and low reaction temperatures were used, which resulted in relatively low carbon dioxide conversion.

U.S. Pat. No. 5,346,679 disclosed the reduction of carbon dioxide into carbon monoxide with hydrogen using a catalyst based on tungsten sulphide.

U.S. Pat. No. 3,479,149 disclosed using crystalline aluminosilicates as catalyst in the conversion of carbon monoxide and water to carbon dioxide and hydrogen, and vice versa.

U.S. Pat. No. 5,496,530 disclosed carbon dioxide hydrogenation to syngas in the presence of nickel and iron oxide and copper or zinc containing catalysts.

In WO 96/06064A1, a process for methanol production is described, which comprises a step of converting part of the carbon dioxide contained in a feed mixture with hydrogen to carbon monoxide, in the presence of a WGS catalyst exemplified by Zn-Cr/alumina and $MoO_3$/alumina catalysts.

WO 2005/026093A1 disclosed a process for producing dimethylether (DME), which comprises a step of reacting carbon dioxide with hydrogen in a RWGS reactor to provide carbon monoxide, in the presence of a ZnO supported catalyst; a $MnO_x$ (x=1~2) supported catalyst; an alkaline earth metal oxide supported catalyst and a NiO supported catalyst.

EP 1445232A2 disclosed a RWGS reaction for production of carbon monoxide by hydrogenation of carbon dioxide at high temperatures, in the presence of a Mn—Zr oxide catalyst. A drawback of this process for syngas production as disclosed above is the selectivity of the catalyst employed; that is methane formation from carbon dioxide is still observed as a side-reaction. In the illustrative example, this methane formation was quantified as 0.8 vol % of methane being formed in the gas output of the reactor, at a degree of conversion of carbon dioxide of 40%.

GB 2168718A and U.S. Pat. No. 6,328,945B1 also disclose processes that combine methane reforming and RWGS steps are disclosed, but these publications do not describe or suggest the use of a catalyst as defined in the present invention.

While numerous catalysts and processes have been developed for the production of syngas from hydrogen and carbon dioxide, there is still a need in the art for new, distinct and often improved catalysts and processes for the production of usable syngas mixtures from carbon dioxide and hydrogen, where the catalysts and processes result in relatively high carbon dioxide conversions with minimal or no production of alkane byproducts and where the catalysts are stable and slow to deactivate even after extended on-stream times.

SUMMARY OF THE INVENTION

Embodiments of this invention provide processes of making synthesis gas (syngas) mixtures containing hydrogen, carbon monoxide and carbon dioxide under isothermal conditions. The processes comprise contacting a gaseous feed mixture including carbon dioxide and hydrogen with a catalyst comprising a supported manganese oxide catalyst including at least one auxiliary metal selected from the group consisting of La, Ca, K, W, Cu, and Al, where one of the elements may be used as a support while other elements are used to modify the activity of the manganese oxide, resulting in the hydrogenation of carbon dioxide to a desired syngas mixture.

Embodiments of this invention provide processes comprising contacting a gaseous feed mixture including carbon dioxide, hydrogen, and an alkane with a catalyst comprising a supported manganese oxide catalyst including at least one auxiliary metal selected from the group consisting of La, Ca, K, W, Cu, and Al under isothermal conditions, where one of the elements may be used as a support while other elements are used to modify the activity of the manganese oxide. The processes includes reforming methane and hydrogenating carbon dioxide to a syngas mixture. In certain embodiments, the alkane comprises methane.

Embodiments of this invention provide processes for making a chemical product using a syngas mixture of this invention as an intermediate material or as feed material. The processes first comprise converting carbon dioxide and hydrogen in a carbon dioxide hydrogenation step to a syngas mixture, and second the processes comprise converting the syngas mixture alone or in combination with other compounds into the chemical products. In certain embodiments, the syngas mixtures may be used in methanol production, olefin synthesis, production of aromatics, hydroformylation of olefins, carbonylation of methanol, and/or carbonylation of olefins.

Embodiments of this invention provide catalysts for the conversion of carbon dioxide and hydrogen (carbon dioxide hydrogenation) to syngas mixture comprising carbon monoxide, carbon dioxide and hydrogen. The catalysts comprise supported manganese oxide catalysts including one or more auxiliary metal selected from the group consisting of La, Ca, K, W, Cu, and Al. In certain embodiments, a mole ratio of Mn to all auxiliary metals used in the catalysts prior to the Mn and auxiliary metal mixture being supported may range from about 4:1 to about 1:4. In these catalysts, the total amount of auxiliary metals is fixed by the Mn to auxiliary metals mole ratio, while each auxiliary metal may vary from zero to the total amount required by the Mn to auxiliary metals mole ratio. Alternatively, the catalysts may be characterized as having a Mn content ranging from 1 wt. % to 30 wt. % based on the total weight of the supported catalyst and an aggregate auxiliary metal content ranging from 1 wt. % to 30 wt. % based on the total weight of the supported catalyst. In other embodiments, the Mn and the auxiliary metal may be used in the form of a mixture of two oxides or may be supported on a support material, where auxiliary metal oxide or the support material may be selected from the group La, Ca, K, W, Cu, or Al. In particular embodiments, the support material Al.

Embodiments of this invention provide processes of making a syngas mixture including hydrogen, carbon monoxide and carbon dioxide, comprising a step of contacting a gaseous feed mixture including carbon dioxide and hydrogen in the presence of a catalyst, where the catalyst comprises a supported manganese oxide catalyst including one more auxiliary metals selected from the group consisting of La, Ca, K, W, Cu, and Al.

In certain embodiments, the catalysts of this invention have a Mn to auxiliary metals mole ratio ranges from 4:1 to 1:4. In other embodiments, the mole ratio ranges from 3:1 to 1:3. In other embodiments, the mole ratio ranges from 1:2 to 2:1. In other embodiments, the mole ratio ranges from 1:1.5 to 1.5:1. In other embodiments, the mole ratio is 1:1.

In certain embodiments, the support is selected from the group consisting of $Al_2O_3$, MgO, $SiO_2$, $TiO_2$, $ZrO_2$, and mixtures or combinations. In other embodiments, the auxiliary metal is Cu. In other embodiments, the support comprises alumina. In other embodiments, the auxiliary metal is Cu and the support comprises alumina. In other embodiments, a Mn to Cu mole ratio ranges from 4:1 to 1:4. In other embodiments, the Mn to Cu mole ratio ranges from 3:1 to 1:3. In other embodiments, the Mn to Cu mole ratio ranges from 1:2 to 2:1. In other embodiments, the Mn to Cu mole ratio ranges from 1:1.5 to 1.5:1. In other embodiments, the Mn to Cu mole ratio is 1:1.

In certain embodiments, the contacting step is carried out at a temperature between 300° C. and 600° C., at a pressure between 0.1 MPa and 6 MPa, and with a contact time between 0.5 s and 6 s. In other embodiments, the feed mixture contains hydrogen and carbon dioxide in a ratio of from 1 to 5. In certain embodiments, the syngas has a stoichiometric number of from 0.1 to 3.0.

In certain embodiments, the feed mixture further comprises an alkane. In other embodiments, the alkane comprises methane.

In certain embodiments, the processes further comprise the step of using a syngas mixture as an intermediate or as feed material in a subsequent synthesis to form a chemical product or a plurality of chemical products. In other embodiments, the subsequent synthesis is selected from the group consisting of methanol production, olefin synthesis, aromatics production, hydroformylation of olefins, carbonylation of methanol, and carbonylation of olefins.

DETAILED DESCRIPTION OF THE INVENTION

The inventors have found that catalysts for the formation of synthesis gas (syngas) mixtures under isothermal conditions can be formulated including a manganese oxide and an auxiliary metal oxide on a support, where the catalysts have conversion of carbon dioxide ($CO_2$) of at least 50%. In certain embodiments, the $CO_2$ conversion is at least 55%. In certain embodiments, the $CO_2$ conversion is at least 60%. The inventors have found that auxiliary metals including La, Ca, K, W, Cu, Al and mixtures or combinations thereof significantly improve catalyst activity and selectivity to carbon monoxide. In certain embodiments, a mole ratio of Mn to all auxiliary metals used in the catalysts prior to the Mn and auxiliary metal mixture being supported may range from about 4:1 to about 1:4. In certain embodiments, the mole ratio ranges from about 3:1 to about 1:3. In other embodiments, the mole ratio ranges from about 1:2 to about 2:1. In other embodiments, the mole ratio ranges from about 1:1.5 to about 1.5:1. In other embodiments, the mole ratio is 1:1. In these catalysts, the total amount of auxiliary metals is fixed by the Mn to auxiliary metals mole ratio, while each auxiliary metal may vary from zero to the total amount required by the Mn to auxiliary metals mole ratio. Alternatively, the catalysts may be characterized as having a Mn content ranging from 1 wt. % to 30 wt. % based on the total weight of the supported catalyst and an aggregate auxiliary metal content ranging from 1 wt. % to 30 wt. % based on the total weight of the supported catalyst. In other embodiments, the Mn content and the aggregate auxiliary metal content range from 2.5 wt. % to about 25 wt. % based on the total weight of the supported catalyst. In other embodiments, the Mn content and the aggregate auxiliary metal content range from 5 wt. % to about 20 wt. % based on the total weight of the supported catalyst. In other embodiments, the Mn content and the aggregate auxiliary metal content range from 5 wt. % to about 15 wt. % based on the total weight of the supported catalyst. In other embodiments, the Mn content and the aggregate auxiliary metal content range from 7.5 wt. % to about 12.5 wt. % based on the total weight of the supported catalyst. In other embodiments, the Mn content and the aggregate auxiliary metal content are about 10 wt. % based on the total weight of the supported catalyst. In these catalysts, the auxiliary metal content may include a single auxiliary metal or a combination of two or more auxiliary metals. The inventors have also found that the catalysts are highly active under isothermal conditions in the mid temperature range between about 300° C. and about 600° C.

The invention is related to the conversion of $CO_2$ by hydrogen to a syngas using mixed oxide catalysts based on manganese oxide (MnO) modified with metals selected from the group consisting of La, Ca, K, W, Cu, Al and mixtures or combinations thereof and prepared using support material such as aluminum oxide comprising the simultaneous precipitation of the support together with the active elements at suitable proportions and preparation conditions such as pH value of the precipitation, calcination conditions and pretreatments of the catalysts during testing.

Suitable Reagents

Suitable forms of manganese (Mn) oxides for use in the preparation of catalysts of this invention present include, without limitation, $MnO_2$, $Mn_2O_3$, $Mn_3O_4$, and mixtures thereof. The Mn-content of the catalyst may vary within broad ranges. A certain minimum content is needed to reach a desired level of catalyst activity, but a high content may increase a chance of active site agglomeration, which may reduce catalyst efficiency. A suitable Mn-content ranges from about 1 wt. % to about 50 wt. % (elemental Mn based on total weight of the supported catalyst composition). In certain embodiments, the Mn-content ranges from about 5 wt. % to about 30 wt. %. In other embodiments, the Mn-content ranges from about 5 wt. % to about 15 wt. %. In other embodiments, the Mn content ranges from 1 wt. % to 30 wt. % based on the total weight of the catalyst. In other embodiments, the Mn content ranges from 2.5 wt. % to about 25 wt. %. In other embodiments, the Mn content ranges from 5 wt. % to about 20 wt. %. In other embodiments, the Mn content ranges from 5 wt. % to about 15 wt. %. In other embodiments, the Mn content ranges from 7.5 wt. % to about 12.5 wt. %. In other embodiments, the Mn content is about 10 wt. %.

Suitable auxiliary metals for use in the preparation of the catalysts of this invention include, without limitation, lanthanum (La), calcium (Ca), potassium (K), tungsten (W), copper (Cu), aluminum (Al) and mixtures or combinations thereof. The amount of Mn and the aggregate amount of auxiliary metal components present in the catalysts of this invention may vary within a broad mole ratio ranging from about 4:1 to about 1:4. In certain embodiments, the mole ratio ranges from about 3:1 to about 1:3. In other embodiments, the mole ratio ranges from about 1:2 to about 2:1. In other embodiments, the mole ratio ranges from about 1:1.5 to about 1.5:1. In embodiments, the mole ratio is about 1:1. It should be recognized that in the catalysts having two or more auxiliary metals, the amount of each auxiliary metal may assume any value; provided that the aggregate or total amount of auxiliary metals satisfies the mole ratio of Mn to auxiliary metals. For example, if a catalyst of this invention include both La and Cu as auxiliary metals with Mn, then the mole ratio of La and Cu to Mn satisfies the mole ratio of Mn to auxiliary metals of the specific catalyst. Alternatively, the catalysts of this invention may be characterized by having an aggregate auxiliary metal content ranging from 1 wt. % to 30 wt. % based on the total weight of the catalyst. In other embodiments, the auxiliary metal content ranges from 2.5 wt. % to about 25 wt. %. In other embodiments, the auxiliary metal content ranges from 5 wt. % to about 20 wt. %. In other embodiments, the auxiliary metal content ranges from 5 wt. % to about 15 wt. %. In other embodiments, the auxiliary metal content ranges from 7.5 wt. % to about 12.5 wt. %. In other embodiments, the auxiliary metal content is about 10 wt. %. Within all of these ranges, if two or more auxiliary metals are used, the amount of each auxiliary metal may vary provided that the total amount satisfies the range.

Suitable Mn and auxiliary metal sources for use for use in the preparation of the catalysts of this invention include, without limitation, nitrates, halides, organic acid, inorganic acid, hydroxides, carbonates, oxyhalides, sulfates and other groups which may exchange with oxygen under high temperatures so that the metal compounds become metal oxides, etc.

Catalysts and Processes Using the Catalysts

The catalyst used in the processes according to the invention may further comprise an inert carrier or support material or combination of carriers or support materials, of a certain particle size and geometry. In certain embodiments, the geometric form of the catalyst comprises spherical pellets, extrudates, tablets, rings, or other convenient forms.

Suitable supports include, without limitation, support materials having good stability at the reaction conditions to be applied in the process of the invention, and are known by a person skilled in the art of catalysis or mixtures of support materials. In certain embodiments, the support material is at least one member selected from the group consisting of alumina, magnesia, silica, titania, zirconia and mixtures or combinations thereof. $Al_2O_3$ and MgO are found to be very well suited as support in the present process. In a particular embodiments, the support material is lanthanum oxide or (oxy)carbonate, e.g., $La_2O_3$, but these support materials may or are believe to also contribute to catalyst activity.

The amount of support material or materials present in the catalyst compositions used in the processes according to the present invention may vary within broad ranges; a suitable range is from 40 wt. % to 95 wt. % (based on total weight of the catalyst composition). In certain embodiments, the support forms from 50 wt. % to 90 wt. %. In other embodiments, the support forms from 60 wt. % to 85 wt. % of total catalyst composition. In case of La-oxides, La content may vary from 0.1 wt. % to 95 wt. %.

The catalyst compositions used in the processes of the invention are prepared by co-precipitation of a Mn source, an auxiliary metal source and a support source.

In embodiments of the processes of the invention, the processes include the step of contacting the gaseous feed mixture containing carbon dioxide and hydrogen with the catalysts of this invention may be performed over a wide temperature range. As the reaction is endothermic, a high temperature will promote conversion, but too high temperature may also induce unwanted reactions. The reaction is performed under isothermal conditions at temperature ranging from 300° C. to 600° C. In certain embodiments, the temperature ranges from 400° C. to 600° C. In other embodiments, the temperature ranges from 500° C. to 600° C. In other embodiments, the temperature ranges from 530° C. to 600° C. In other embodiments, the temperature ranges from 540° C. to 580° C. In other embodiments, the temperature ranges from 560° C. to 570° C.

The step of contacting the gaseous feed mixture containing carbon dioxide and hydrogen with a catalyst of this invention according to the processes of the invention may be performed over a wide pressure range. A higher pressure tends to enable lower reaction temperatures, but very high pressures are not practical; therefore, this step is generally performed at a pressure ranging from 0.1 to 6 MPa. In other embodiments, the pressure ranges from 1.5 to 5 MPa. In other embodiments, the pressure ranges from 2 to 4 MPa.

The contact time in the step of contacting the gaseous feed mixture containing carbon dioxide and hydrogen with a catalyst of this invention according to the processes of the invention may vary widely, but is generally from 0.5 to 6 s. In certain embodiments, the contact time ranges from 1.5 to 5 s. In certain embodiments, the contact time ranges from 2 s to 4 s.

The processes according to the invention may be performed in conventional reactors and apparatuses; which are, for example, also used in methane reforming reactions. The skilled artisan will be able to select a suitable reactor set-up depending on specific conditions and circumstances. Suitable types of reactors include, without limitation, continuous fixed bed reactors. In view of the high reaction temperature, and catalytic activity of some metals such as Ni in methanation reactions, use of a material comprising Ni or other active metals for making reactors walls etc. should generally be avoided. For this reason, the reactors used in the practice of the processes of this invention are generally lined with inert materials such as glass linings for relevant reactor parts of the reactor.

In the processes according to the present invention, carbon dioxide is selectively converted into carbon monoxide by a reverse water gas shift (RWGS) reaction in the presence of a specific catalyst of this invention. The resulting product of this $CO_2$ hydrogenation process is a gas mixture containing carbon monoxide and water, and non-converted carbon dioxide and hydrogen. This can, in case of excess hydrogen, also be represented by the following equation:

$$CO_2 + nH_2 \rightleftharpoons CO + (n-1)H_2 + H_2O$$

The water formed in this reaction is generally removed from the product stream driving the equilibrium of the reaction in the desired direction, because water often interferes with subsequent reactions utilizing the syngas. Water can be removed from the product stream with any suitable method known in the art, e.g. condensation, liquid/gas separation, etc.

The amount of hydrogen in the feed gas, that is the value for n in the above reaction scheme, may vary widely, for example from n=1 to n=5, to result in a syngas composition, e.g. expressed as its $H_2/CO$ ratio or as the stoichiometric number (SN), which can consequently vary within wide limits. The advantage thereof is that the syngas composition may be adjusted and controlled to match desired end-use requirements.

Although SN may vary outside these ranges, in certain embodiments, the SN of the produced syngas mixture ranges from 0.1 to 3.0. In other embodiments, the SN ranges from 0.5 to 2.8. In other embodiments, the SN ranges from 0.9 to 2.7. Such syngas product streams may be further employed as feedstocks in different syngas conversion processes, such as methanol formation, olefin synthesis, reduction of iron oxide in steel production, oxosynthesis, (hydro)carbonylation reactions, etc.

In certain embodiments, the feed gas contains equimolar amounts of $CO_2$ and $H_2$. In other embodiments, the feed gas contains $CO_2$ and $H_2$ in molar ratio of 1:2 (n=2 in above equation), resulting in a syngas composition with a SN of about 1, which may be advantageously used for producing oxygenates.

In yet other embodiments, the feed gas contains $CO_2$ and $H_2$ in molar ratio of 1:3 (n=3 in above equation), resulting in a syngas composition with a SN of about 2; which can be advantageously used in olefin or methanol synthesis processes.

The carbon dioxide in the gaseous feed mixture used in the processes of the invention may originate from various sources. In certain embodiments, the carbon dioxide comes from a waste gas stream, e.g. from a plant on the same site, like for example from ammonia synthesis, optionally with (non-catalytic) adjustment of the gas composition, or after recovering the carbon dioxide from a gas stream. Recycling such carbon dioxide as starting material in the processes of the invention thus contributes to reducing the amount of carbon dioxide emitted to the atmosphere (from a chemical production site). The carbon dioxide used as feed may also at least partly have been removed from the effluent gas of the RWGS reaction itself and recycled back to the reactor in the feed mixture.

An advantage of the processes of this invention is that the product stream of the carbon dioxide hydrogenation reaction may be combined and even integrated with other stream. For example, the carbon dioxide reaction product stream may be combined with a product from the steam reforming of an alkane such as methane or dry reforming of an alkane such as methane (also called $CO_2$ reforming) for converting the feed stream into methanol or other chemical products.

The invention thus also relates to an integrated process for making syngas comprising a hydrocarbon reforming step such as a methane reforming step and a RWGS step. By simultaneously operating these syngas producing reaction steps, the syngas composition may be better controlled, for example a syngas with SN of about 2 may be obtained, with high hydrogen selectivity. Simultaneous conversion of carbon dioxide with hydrogen and methane may be represented by the following reaction scheme:

$$CO_2 + 2H_2 + CH_4 \rightarrow 2CO + 4H_2$$

In certain embodiments, the hydrogen to carbon dioxide ratio in the feed mixture is at least 2 in this combined process according to the invention, because such excess hydrogen in the gas streams prevents coke formation, which could otherwise de-activate the catalyst; and thus this process results in good catalyst stability.

The invention further relates to the use of the syngas mixture obtained with the processes according to the invention as feed material for a process of making a chemical product; such processes include methanol production, olefin synthesis (e.g. via Fischer-Tropsch catalysis), aromatics production, oxosynthesis, carbonylation of methanol, carbonylation of olefins, or the reduction of iron oxide in steel production.

In certain embodiments, the invention concerns processes of making oxo alcohols via hydroformylation of olefins with syngas, comprising the steps of methane reforming and carbon dioxide hydrogenation according to the invention, to result in a syngas mixture of suitable stoichiometry. By integrating methane (steam) reforming and RWGS steps, the excess hydrogen available in the reformate is advantageously utilized to optimize the amount of carbon monoxide formed. The amount of CO formed in the RWGS step can also be controlled by the reaction temperature. In certain embodiments, the syngas made has a composition characterized by a SN of about 1.

In other embodiments, the invention concerns processes of making methanol from methane via synthesis gas, comprising a step wherein carbon dioxide is hydrogenated according to the invention, to result in a syngas mixture of suitable stoichiometry. In certain embodiments, the SN is about 2. For the step of making methanol from syngas in this process, any suitable synthesis process as known in the art can be applied. In other embodiments, purge gas from the methanol synthesis reaction, containing hydrogen and carbon dioxide is recycled back to the carbon dioxide hydrogenation step. A further advantage of this process according to the invention is that the heat produced in the exothermic methanol synthesis step may be utilized in the endothermic RWGS step.

The invention will now be further elucidated with the following illustrative experiments.

EXPERIMENTS OF THE INVENTION

General Catalyst Preparation

The catalysts of this invention were prepared with alumina ($Al_2O_3$) as a support. All of the catalysts were prepared using a co-precipitation method. Mn content and the auxiliary metal content were varied between 1.57 wt. % and 10 wt. % based in the total weight of the catalyst.

In a 1000 mL beaker, under stirring at 400 rpm, an amount of Mn source, an amount of an auxiliary metal source and an amount of aluminum source were dissolved in 500 mL of deionized (DI) water, where the amounts are adjusted to produce catalysts having a Mn content of 10 wt. % and a Cu content of 10 wt. % (Catalyst 1), a Mn content of 10.45 wt. % and a Cu content of 4.78 wt. % Cu (Catalyst 2), and a Mn content of 11.12 wt. % and a Cu content 1.57 wt. % (Catalyst 3). A 20 wt. % solution of $NH_4OH$ was added to the salt mixture in small portions until a pH of a resulting slurry was adjusted to about pH 9.0. The slurry was then stirred for 10 minutes to stabilize the pH. If there was any deviation, then more of the 20 wt. % solution of $NH_4OH$ was added to the slurry to keep the pH constant at about pH 9.0. The mixture was then heated using a Cimarac-II, heating mantle heating knob was set at position #10. When the temperature reached about 70° C., the heating knob was set back to position #3. The temperature of the mixture was stabilized at 75±3° C. and kept at that temperature for 30 minutes.

Stirring and heating of each mixture was stopped. Each slurry was cooled to room temperature and filtered under vacuum. The catalyst precursors were then kept under vacuum for 30 minutes until all the water was drained. The cakes, thus obtained, have different colors depending upon the exact composition of components in the precursors.

The cakes were then transferred to a porcelain dish and placed in a heating oven for calcination. The catalyst precursors were heated at a rate of 5° C./minute up to a drying temperature of 125° C. and held at that temperature for 6 hours. Next, the catalyst precursors were heated at 10° C./minute up to a temperature of 250° C. for 6 hours, in an air flow of 3.0 L/min. Next, the catalyst precursors were heated at 10° C./minute up to a temperature of 650° C., in an air flow of 3.0 L/min. The solid catalysts were crushed to powder and sieved form product having passed through screen having mesh values between 20 mesh and 50 mesh. In certain cases, if the catalyst was fragile, then it was pressed at 20 klbs before crushing and sieving to 18 mesh to 30 mesh.

Examples 1-3

Mn/Cu alumina supported catalysts of this invention were prepared as set forth above with Mn content and the auxiliary metal content varying between 1.57 wt. % and 10 wt. % based on the total weight of the catalyst. Catalyst 1 has a Mn content of 10 wt. % and a Cu content of 10 wt. % characterized by a Mn to Cu weight ratio of 1. Catalyst 2 has a Mn content of 10.45 wt. % and a Cu content of 4.78 wt. % Cu characterized by a Mn to Cu weight ratio of about 2.2. Catalyst 3 has a Mn content of 11.12 wt. % and a Cu content 1.57 wt. % characterized by a Mn to Cu weight ratio of about 7.1.

In a 1000 mL beaker, under stirring at 400 rpm, the amount of $Mn(NO_3)_2$, the amount of $Cu(NO_3)_2$ and the amount of $Al(NO_3)_3$ were dissolved in 500 mL of deionized (DI) water to produce Catalysts 1-3. A 20% solution of $NH_4OH$ was added to the salt mixture in small portions until the pH of slurry was adjusted to about pH 9.0. The mixture was then stirred for 10 minutes to stabilize the pH. If there was any deviation, then more 20% solution of $NH_4OH$ was added to the slurry to keep the pH constant at about 9.0. The mixture was then heated using a heating mantle heating knob targeting a temperature of about 70° C. When temperature reached about 70° C., the heating was reduced. The temperature of the mixture was stabilized at 75±3° C. and kept at that temperature for 30 minutes.

Stirring and heating of each mixture was stopped. Each slurry was cooled to room temperature and filtered under vacuum. The catalyst precursors were then kept under vacuum for 30 minutes until all the water was drained. The cakes, thus obtained, have different colors depending upon the exact composition of components.

The cakes were then transferred to a porcelain dish and placed in a heating oven for calcination. The catalyst precursors were heated at a rate of 5° C./minute up to a drying temperature of 125° C. and held at than temperature for 6 hours. Next, the catalyst precursors were heated at 10° C./minute up to a temperature of 250° C. for 6 hours, in an air flow of 3.0 L/min. Next, the catalyst precursors were heated at 10° C./minute up to a temperature of 650° C., in an air flow of 3.0 L/min. The solid catalysts were crushed to powder and sieved form product having passed through screen having mesh values between 20 mesh and 50 mesh. In certain cases, if the catalyst was fragile, then it was pressed at 20 klbs before crushing and sieving to 18 mesh to 30 mesh. The following examples are merely illustrative and are not intended to be limiting of the invention.

Catalyst Performance

Catalyst 1-3 were tested for RWGS reaction activity at 560° C. Catalyst 1 showed high RWGS activity and high selectivity to carbon monoxide (CO). The conversion and activity data for Catalyst 1 are tabulated in Table I

TABLE I

Performance of Catalyst 1 at 560° C.

| Time (days) | Products (mole %) | | | Conversion |
|---|---|---|---|---|
| | $CO_2$ | CO | $H_2$ | |
| 1 | 7.5 | 12.9 | 76.0 | 62.9 |
| 2 | 7.5 | 12.8 | 76.6 | 62.9 |
| 3 | 7.5 | 12.8 | 76.5 | 62.9 |
| 4 | 7.5 | 12.8 | 77.1 | 62.9 |
| 5 | 7.6 | 12.8 | 77.2 | 62.9 |
| 6 | 7.6 | 12.9 | 77.6 | 62.9 |
| 7 | 7.6 | 12.9 | 77.5 | 62.9 |
| 8 | 7.6 | 12.9 | 77.0 | 62.9 |
| 9 | 7.6 | 13.0 | 77.6 | 62.9 |
| 10 | 7.6 | 12.9 | 77.3 | 62.9 |
| 11 | 7.6 | 12.8 | 77.0 | 62.8 |
| 12 | 7.6 | 12.8 | 77.0 | 62.9 |
| 13 | 7.5 | 12.8 | 76.7 | 62.9 |

The data in Table I indicated that Catalyst 1 had a conversion of $CO_2$ of about 63% at a temperature of 560° C., where the feed mixture is converted into a reaction mixture including between 7.5 mole % and 7.6 mole % $CO_2$, 12.8 mole % to 13.0 mole % CO and 76.0 mole % to 77.6 mole % $H_2$.

Table II showed the performance of Catalyst 2 The data showed that Catalyst 2 has high and stable performance over a long period of time at 560° C.

TABLE II

Performance of Catalyst 2 at 560° C.

| Time (days) | Products (mol %) | | | Conversion |
|---|---|---|---|---|
| | $CO_2$ | CO | $H_2$ | |
| 1 | 7.4 | 12.9 | 77.7 | 63.6 |
| 2 | 7.4 | 12.9 | 77.3 | 63.5 |
| 3 | 7.4 | 12.7 | 77.1 | 63.2 |
| 4 | 7.4 | 12.8 | 77.2 | 63.2 |
| 5 | 7.4 | 12.8 | 77.2 | 63.2 |
| 7 | 7.4 | 12.8 | 77.3 | 63.3 |
| 9 | 7.4 | 12.8 | 77.5 | 63.3 |
| 11 | 7.4 | 12.7 | 77.3 | 63.3 |
| 13 | 7.4 | 12.7 | 77.5 | 63.3 |
| 15 | 7.4 | 12.6 | 78.9 | 62.9 |
| 17 | 7.3 | 12.6 | 76.7 | 63.3 |
| 18 | 7.3 | 12.6 | 77.0 | 63.4 |
| 20 | 7.3 | 12.5 | 76.7 | 63.3 |
| 22 | 7.3 | 12.5 | 77.2 | 63.3 |
| 23 | 7.2 | 12.6 | 77.4 | 63.4 |
| 24 | 7.3 | 12.6 | 76.6 | 63.4 |
| 25 | 7.2 | 12.5 | 76.1 | 63.4 |
| 27 | 7.3 | 12.6 | 77.4 | 63.4 |
| 29 | 7.3 | 12.6 | 76.7 | 63.4 |

The data in Table II indicated that Catalyst 2 had a conversion of $CO_2$ of about 63% at a temperature of 560° C., where the feed mixture is converted into a reaction mixture including between 7.2 mole % and 7.4 mole % $CO_2$, 12.5 mole % to 12.9 mole % CO and 76.1 mole % to 77.7 mole % $H_2$.

Table III shows the performance of Catalyst 3. The data showed that Catalyst 3 had a high initial conversion, but the conversion dropped off during long term performance.

TABLE III

Performance of Catalyst 3 at 560° C.

| Time (days) | Product (mole %) | | | Conversion |
|---|---|---|---|---|
| | $CO_2$ | CO | $H_2$ | |
| 1 | 7.2 | 12.3 | 73.9 | 63.1 |
| 2 | 7.6 | 12.4 | 75.3 | 61.8 |
| 3 | 7.8 | 12.2 | 76.2 | 60.9 |
| 4 | 7.9 | 11.7 | 76.7 | 59.5 |
| 5 | 8.1 | 11.5 | 76.6 | 58.6 |
| 6 | 8.2 | 11.3 | 75.9 | 57.7 |
| 7 | 8.3 | 11.2 | 76.4 | 57.5 |

Comparing the activity and selectivity of Catalysts 1-3, the data showed that catalyst performance is adversely affected when the Mn to Cu weight ratio is above about 5 as at 7.1, the catalyst activity over time diminishes from an initial conversion of 63.1% to a conversion of 57.5% in seven days ,while catalyst having Mn to Cu weight ratios of 1 and 2.2 are stable for extended periods of time showing no loss in conversion or selectivity.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A process of making a syngas mixture including hydrogen, carbon monoxide and carbon dioxide under isothermal conditions, comprising a step of contacting a gaseous feed mixture including carbon dioxide and hydrogen in the presence of a catalyst, where the catalyst comprises a supported manganese oxide catalyst including one more auxiliary metals selected from the group consisting of La, Ca, K, W, Cu, and Al.

2. The process according to claim 1, wherein Mn to auxiliary metals mole ratio ranges from 4:1 to 1:4.

3. The process according to claim 2, wherein the mole ratio ranges from 3:1 to 1:3.

4. The process according to claim 3, wherein the mole ratio ranges from 1:2 to 2:1.

5. The process according to claim 4, wherein the mole ratio ranges from 1:1.5 to 1.5:1.

6. The process according to claim 5, wherein mole ratio is 1:1.

7. The process according to claim 1, wherein the support is selected from the group consisting of $Al_2O_3$, MgO, $SiO_2$, $TiO_2$, $ZrO_2$, and mixtures or combinations.

8. The process according to claim 1, wherein the auxiliary metal is Cu.

9. The process according to claim 1, wherein the support comprises alumina.

10. The process according to claim 1, wherein the auxiliary metal is Cu and the support comprises alumina.

11. The process according to claim 10, wherein a Mn to Cu mole ratio ranges from 4:1 to 1:4.

12. The process according to claim 11, wherein the Mn to Cu mole ratio ranges from 3:1 to 1:3.

13. The process according to claim 12, wherein the Mn to Cu mole ratio ranges from 1:2 to 2:1.

14. The process according to claim 13, wherein the Mn to Cu mole ratio ranges from 1:1.5 to 1.5:1.

15. The process according to claim 14, wherein the Mn to Cu mole ratio is 1:1.

16. The process according to claim 1, wherein the contacting step is carried out at a temperature between 300° C. and 600° C., at a pressure between 0.1 MPa and 6 MPa, and with a contact time between 0.5 s and 6 s.

17. The process according to claim 1, wherein the feed mixture contains hydrogen and carbon dioxide in a ratio of from 1 to 5.

18. The process according to claim 1, wherein the syngas has a stoichiometric number of from 0.1 to 3.0.

19. The process according to claim 1, wherein the feed mixture further comprises an alkane.

20. The process according to claim 19, wherein the alkane comprises methane.

21. The process according to claim 1, further comprising the step of:

using a syngas mixture as an intermediate or as feed material in a subsequent synthesis to form a chemical product or a plurality of chemical products.

22. The process according to claim 21, wherein the subsequent synthesis is selected from the group consisting of methanol production, olefin synthesis, aromatics production, hydroformylation of olefins, carbonylation of methanol, and carbonylation of olefins.

23. The process according to claim 1, wherein the one more auxiliary metal is selected from the group consisting of Ca, Ic and Al.

* * * * *